United States Patent [19]
Laird et al.

[11] Patent Number: 5,362,460
[45] Date of Patent: Nov. 8, 1994

[54] MAGNESIUM SEPARATION FROM DOLOMITIC PHOSPHATE BY SULFURIC ACID LEACHING

[75] Inventors: Douglas H. Laird; Wendy K. Hanson, both of San Diego, Calif.

[73] Assignee: Science Ventures Inc., San Diego, Calif.

[21] Appl. No.: 125,807

[22] Filed: Sep. 24, 1993

[51] Int. Cl.$^5$ ............................................. C01F 5/00
[52] U.S. Cl. .................................. 423/157.4; 423/169
[58] Field of Search ............................. 423/157.4, 169

[56] References Cited

U.S. PATENT DOCUMENTS 3,522,003  7/1970  Lopker .............................. 423/157.4
4,154,799  5/1979  Hauge ............................... 423/157.4
4,181,703  1/1980  Wengeler et al. ................. 423/157.4

FOREIGN PATENT DOCUMENTS 1909 of 1881  United Kingdom ................ 423/169
366177  4/1973  U.S.S.R. .

Primary Examiner—Wayne Langel

[57] ABSTRACT

Process for dissolving unwanted magnesium from phosphate ores by leaching with dilute sulfuric acid at automatically controlled pH. Minerals so treated are more easily converted by the conventional "wet" process into phosphoric acid, and yield better quality phosphoric acid. Magnesium So leached is precipitated with lime or dolime in a second conventional processing step to make byproduct magnesium hydroxide. An anion such as nitrate, acetate or formate is maintained in the recirculating leach solution in concentration sufficient that calcium sulfate does not precipitate with product magnesium hydroxide. Nearly pure carbon dioxide can be recovered as a second byproduct.

10 Claims, 1 Drawing Sheet

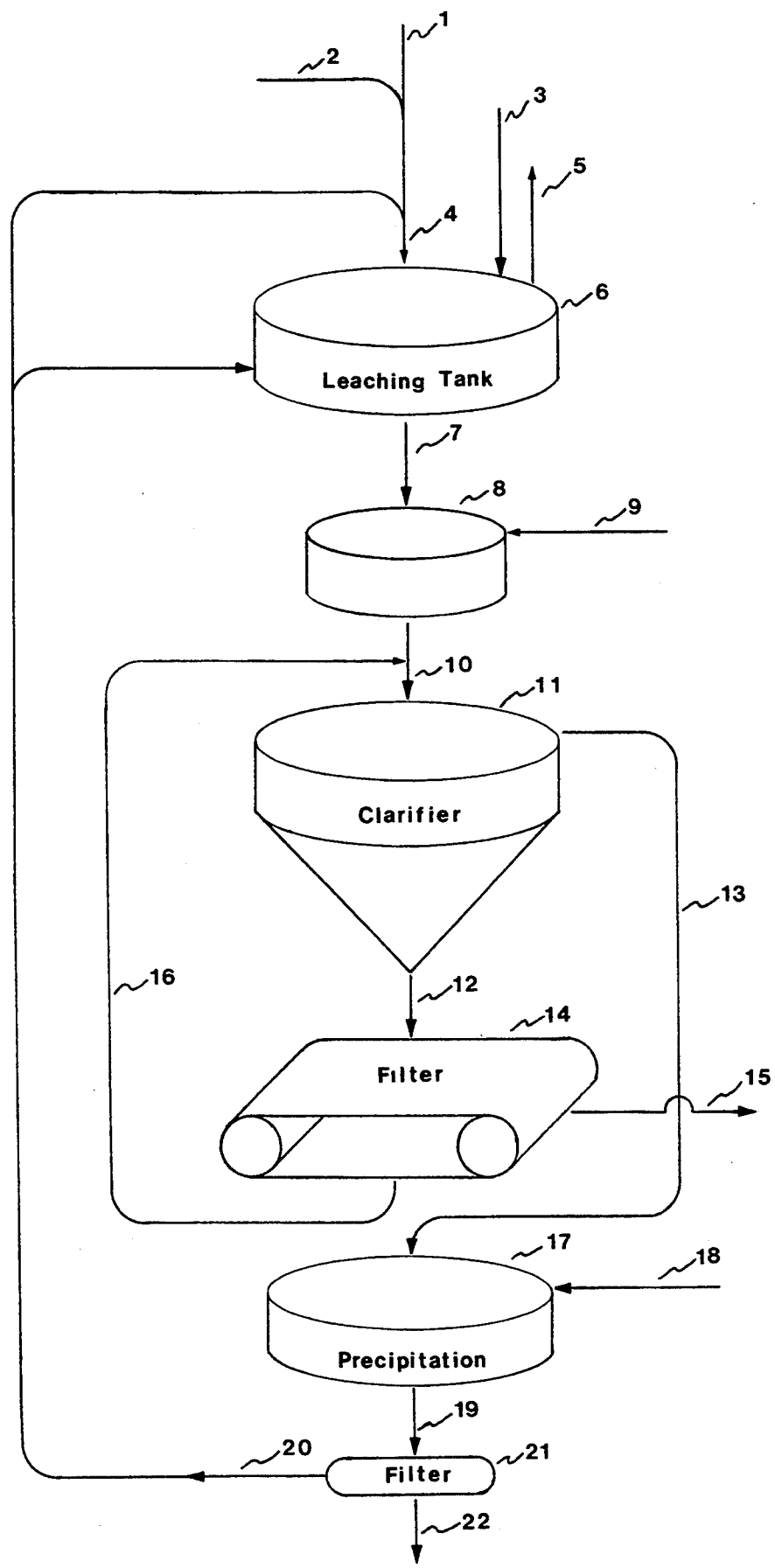

MAGNESIUM SEPARATION FROM DOLOMITIC PHOSPHATE BY SULFURIC ACID LEACHING

BACKGROUND OF THE INVENTION

1. Field of the Invention

This is a method pertaining to fertilizer chemistry, for leaching or chemical beneficiation of dolomitic phosphate mineral ores. The ore so leached is more desirable for use in conventional manufacture of fertilizer-grade phosphoric acid by acidulation with sulfuric acid. Magnesium hydroxide byproduct is precipitated from the leachate, and pure carbon dioxide can be separated as a second byproduct.

2. Discussion of Prior Art

Although the highest quality US phosphate resources are being depleted, great reserves of dolomitic phosphate ore remain. These deposits are less desirable because of their magnesium content. Magnesium present in ore is produced in the phosphoric acid making it highly viscous so that filtration is difficult. When the phosphoric acid is later reacted with ammonia to form ammonium phosphate fertilizers, magnesium in the acid forms troublesome magnesium ammonium phosphate. This product crystallizes slowly and tends to deposit inside pipes and vessels. Its reversible hydration interferes with handling and weighing of the final fertilizer. A process is needed for the economical removal of magnesium.

Four different magnesium-separation methods have previously been developed to various stages: 1) Flotation using air bubbles brings one mineral to the surface while another sinks. Surfactants help bubbles attach to particle surfaces. 2) Very finely pulverized dense solid material such as ferrosilicon is mixed with water to make a semi-fluid mud of controlled density intermediate between dolomite and phosphatic minerals. The dolomitic fraction tends to rise to the surface with agitation in this "heat media" separation while phosphate sinks. 3) Ion exchange recovers magnesium sulfate from phosphoric acid after it is produced by strong acidulation of ore. 4) Acid leaching dissolves the carbonate minerals calcite and dolomite but not phosphate, Most prior efforts to remove the dolomite have been directed at flotation (U.S. Pat. Nos. 4,636,303, 4,648,966, 4,804,462, Moudgil et al 1987, Moudgil 1988, Moudgil and Vasudevan 1988, Hanna and Anazia 1990). Unfortunately, the flotation behavior of carbonates closely resembles that of phosphates. Although many combinations of conditioning, surfactants, temperature, ionic strength etc. have been tried, no commercially attractive method has been found. Flotation separation of magnesium has not progressed beyond bench scale in spite of ongoing efforts at University of Florida and elsewhere. In addition, flotation depends on both the chemistry and microscopic surface characteristics of the minerals. Both chemistry and surface characteristics vary from one phosphate deposit to another and between strata in the same deposit, so that many combinations are possible. If a useful flotation method is discovered it may be limited in application to ore types with particular surface characteristics.

Separation by heavy media has progressed to experimental commercial demonstration at a plant owned by International Minerals and Chemicals in Florida. This method is useful only with relatively large particles which move readily through the ferrosilicon mud. Fine particles which inevitably result from ore mining and crushing are discarded, with loss in phosphate values. The large particles which are used are typically composed of both phosphate and carbonate minerals aggregated together into clumps of intermediate density. This interferes with quality of separation.

Flotation and heavy media separate the magnesium by physical means, reducing overall requirement for sulfuric acid. Ion exchange and leaching separate the magnesium by chemical means.

Ion exchange is applied to phosphoric acid after it has been produced by digesting the phosphate ore with strong sulfuric acid. Magnesium is absorbed into an ion exchange resin. The resin is then separated from the phosphoric acid and is treated with additional sulfuric acid to recover magnesium sulfate. This has been known for many years. It is practiced commercially on a small scale. Disadvantages are: 1) relatively low byproduct value for the magnesium sulfate, 2) additional acid requirement for exchange resin regeneration and 3) the difficult filtration of magnesium-containing phosphoric acid is not avoided.

Acid leaching removes the magnesium ahead of the phosphoric acid digester, so that magnesium does not interfere with filtration. Leaching depends on chemical properties of mineral phases in the ore only, and not on microscopic surface structure. It is therefore less sensitive to variation in feed characteristics than is the case with flotation. All of the mined ore can be leached regardless of particle size, so phosphate loss is small. By the methods of this invention, separation is more complete than by any known alternative.

Carbonic acid is a weaker acid than phosphoric acid. Acidity of strength intermediate between carbonic and phosphoric acid can dissolve dolomite and bring its magnesium into solution without dissolving the phosphorus-containing apatite or francolite minerals. Thus purified, phosphate ore can be used in the conventional wet phosacid process.

Weak acids such as acetic acid ionize partially in water. At high concentration, reversible ionization has the effect of limiting and roughly regulating pH. By a suitable choice of weak acid, the leaching solution pH might be made low enough to leach dolomite, but too high to dissolve apatite. The weak acid must be present in molar excess, and pH changes somewhat as it is depleted by reaction.

Several concepts have been explored for dolomite leaching using weak or intermediate-strength acids such as sulfur dioxide, hydroxysulfonic acid, acetic acid, maleic acid or other carboxylic acid (Orlov and Treushchenko 1975, U.S. Pat. No. 4,238,459, SU 469,664). Weak acid leaching has not produced excellent separation due to its inherently imprecise pH control coupled with failure to actively remove carbon dioxide from reaction products.

For example (Hansen, et al 1985) tested leaching with aqueous sulfur dioxide in a gas-tight system. Twelve Variations were tried. Best results removed 65% of the ore magnesium with 3.9% loss of phosphate. Similarly, Abu Elshah et al 1991 tested acetic acid leaching. Their typical result was 60% carbonate removal with 25-30% phosphate loss. When magnesium hydroxide is precipitated from leachates such as these, the co-dissolved phosphate forms magnesium phosphate. Large percentages of magnesium phosphate make the magnesia unsuitable for use in refractories or in production of magnesium metal, the two principal markets for this element.

There is further difficulty when ammonia or ammonium ion is present in the precipitating mixture, as in Soviet patent 366,177. Magnesium ammonium phosphate so formed typically crystallizes slowly and tends to clog filters and deposit in pipes and vessels. This problem is one of the principal motivations for removing magnesium from the phosphate. Such fertilizer also tends to change weight with variation in humidity, and form cakes that interfere with handling.

Weak acids are relatively expensive compared to sulfuric acid. Weak acids can be recovered for reuse as in Soviet patent 469,664, but this adds to process cost and complexity. Sulfuric or some other cheap acid must then be consumed to regenerate the weak acid.

SUMMARY OF THE INVENTION

The principal goal of this invention is to dissolve a major fraction of ore magnesium with negligible loss of phosphate, and to do so without use of expensive chemicals. A further goal is to precipitate dissolved magnesium values as magnesium hydroxide in at least 75% purity.

Our laboratory tests have demonstrated superior separation of magnesium from phosphate by a novel combination of 1) direct leaching with sulfuric acid, 2) accurate regulation of pH by automated control of acid flow, and 3) active removal of the carbon dioxide formed by acid reaction with carbonates.

Essentially all of the dolomitic magnesium can be dissolved in these conditions. A fraction of ore magnesium is typically associated with the phosphate minerals rather than dolomite. This magnesium is thought to substitute for calcium in the crystal lattice of apatite or francolite. Non-carbonate magnesium cannot be leached without bringing phosphate into solution. Separations by flotation or heavy media are subject to the same limitation.

Mined phosphate mineral is prepared for leaching by ball milling or other form of particle size reduction. It is preferred that the mineral be ground or pulverized to such fineness that 50% by weight passes through a sieve with openings 0.075 mm square (200 Tyler mesh).

This particulate mineral matter is agitated or otherwise contacted with an aqueous solution containing calcium nitrate as described below. Agitation should be sufficient that leaching acid is distributed into the slurry quickly, leaving no long-lived pockets of concentrated acidity, and so that most of the slurry particles remain suspended in the liquid. Leaching can be done in a single stirred tank, or in multiple stirred tanks connected for series flow, or in other types of equipment that have been developed for leaching particulate solids by contact with and partial dissolution in liquids.

The pH of leachate contacted with the phosphate mineral is monitored. Acid addition is preferably controlled automatically in response to the pH measurement. Acid should be added as rapidly as possible without causing pH to decline below a fixed setting which is selected based on prior testing with the ore being leached. The pH setting is chosen so that phosphate dissolution does not exceed some limit decided by economy. The pH setting is typically in the range from 3.3 to 4.5. Before the acid contacts the slurry, it is diluted, preferably by mixing with filtrate recirculated from the magnesium hydroxide production step described below.

Leached solid residue is separated from liquid leachate by conventional means. The residue is suitable for phosphoric acid production by the conventional wet phosphoric acid process. The principal commercial use for phosphoric acid so produced is fertilizer made by reaction with ammonia.

Magnesium dissolved in the leachate is precipitated in a subsequent step by addition of lime or calcined dolomite (dolime). This is conventional, but a new element is required to protect the magnesium hydroxide precipitate from contamination by co-precipitated calcium sulfate. An anion must be present in the leach solution, the calcium and magnesium salts of which dissolve readily in water. For purposes of exposition, this anion is shown below as nitrate. Formate or acetate for example are equally acceptable, and can be substituted for nitrate on an equimolar basis in the process and in the following disclosure. Other anions with soluble calcium salts such as chloride are less preferred due to cost and environmental liabilities. The anion can be introduced in the form of its acid or any of its salts. Potassium salts are preferred over other salts. The anion-containing compound may be introduced to the solution at any point in its circulation. It is preferably introduced to the leaching slurry.

Phosphate resources of interest contain calcite and dolomite which are leached by reaction 1, lumping these carbonates together. Gypsum hydration is neglected. The mole ratio of calcium to magnesium in carbonates, n, depends on the proportions and purity of dolomite and calcite minerals, and is typically not less than 1. For each mole of MgO removed from the phosphate, sulfuric acid consumption is $1+n$ moles. Reaction 2 accounts for removal of calcium from the slurry solution and formation of magnesium nitrate.

$$Ca_nMg(CO_3)_{1+n} + (1+n)H_2SO_4 \rightarrow nCaSO_4 + MgSO_4 + (1+n)H_2O + (1+n)CO_2 \qquad (1)$$

$$MgSO_4 + Ca(NO_3)_2 \rightarrow CaSO_4\downarrow + Mg(NO_3)_2 \qquad (2)$$

Sulfuric acid is used for leaching, but magnesium is produced in slurry solution as magnesium nitrate. Calcium sulfate originating from carbonate in the feed solid and from calcium nitrate in raw leach solution combines with leached residue. It is carried harmlessly into the wet phosphoric acid process, where it ultimately combines with the greater volume of gypsum byproduct of phosphoric acid production. Thus, no new waste material is produced.

The nitrate ion is recovered in a separate processing step when magnesium hydroxide is precipitated by addition of lime, dolime or other calcium containing alkaline substance produced by thermal degradation of carbonates.

$$Mg(NO_3)_2 + Ca(OH)_2 \rightarrow Mg(OH)_2\downarrow + Ca(NO_3)_2 \qquad (3)$$

Most of the calcium nitrate solution produced in reaction 3 is recirculated to the leaching step where it is mixed with fresh phosphate mineral to be leached. The remainder of the recirculating solution is used to dilute leaching acid. By this means all of the nitrate and all of the water used in leaching are recycled except for minor filtration loss where leachate is separated from residue.

The minor amount of nitrate on filtered residue becomes part of the ultimate product fertilizer, improving its nitrogen content. A minor amount of nitric acid must be blended with the diluted leaching acid to make up for filtration loss.

The concentration of calcium dissolved in recirculating calcium nitrate solution must be measured. Nitric acid flow to leaching is controlled so that calcium concentration is roughly 0.02 molar or greater measured in slurry withdrawn from the final leaching stage.

Our tests show that carbon dioxide can reach concentrations in the leaching slurry that interfere with further dissolution of dolomite. Magnesium removal accelerates and separation improves when carbon dioxide is actively eliminated from the slurry.

Carbon dioxide can be removed by introducing air into the slurry, by spraying part of the slurry into air over the bulk slurry, or by boiling. Boiling may be done either at atmospheric pressure, or more economically at reduced pressure and lower temperature. When carbon dioxide is eliminated by boiling, it can be collected in high purity for use as a byproduct. Our tests have found no other gases above trace concentration in $CO_2$ eliminated by boiling.

Magnesium removal with ores and conditions we have tested ranges from 66% to 87%. Final phosphate losses range from 0.02% to 1.71%, varying principally with ore type. Although these losses are small compared to those cited in the literature, we have found means to reduce them further by post-treatment of the leached slurry.

Dissolved phosphate can be precipitated by reaction with residual carbonates in leached solids, or more rapidly by reaction with carbonates in unleached phosphate feed material. Best separation results from addition of lime to the stirred slurry until pH reaches 6.0 to 9.5. Stirring is then stopped and the slurry is allowed to settle. This treatment reduces dissolved phosphate concentration by about a factor of 100. Phosphate so separated from the liquid returns to the purified phosphate solid.

Leaching time is reduced with smaller particle size and/or with increased temperature. Heat can be provided by exchange of waste heat that the phosphoric acid digester must eliminate. For example this can be done through common walls between digester vessels and leaching vessels. By so integrating the leaching process with conventional phosphoric acid digestion, the need for active cooling can be eliminated from the phosphoric acid digester.

This invention produces separation of magnesium from phosphate superior to that previously possible. Magnesium hydroxide byproduct can be produced in purity of 98% or better. No expensive or toxic chemicals are required, and the phosphoric acid plant water balance is not affected. Purified phosphate has less tendency to foam in the digester, and its phosphoric acid product is more easily filtered. Also, pure carbon dioxide can be produced.

BRIEF DESCRIPTION OF THE DRAWING

FIG. 1 is a schematic diagram of the principal features of one embodiment of this invention.

Particulate phosphate mineral matter 3 is introduced into a tank or other leaching equipment 6 where it combines with a stirred slurry contained therein. Solution separated from byproduct magnesium hydroxide 20 is recirculated and split into two streams, the larger of which is introduced to leaching equipment 6 to form slurry. Nitric acid 1 flows into the leaching equipment at a rate sufficient to make up for filtration losses and to maintain essentially constant concentration in the recirculating solution. A greater volume of sulfuric acid 2 mixes with the nitric acid. Its flow rate is controlled to maintain a predetermined minimum pH setting in the slurry. A still greater volume of recirculated calcium nitrate solution mixes with the nitric and sulfuric acid streams to form a dilute acid mixture 4 before entering the leaching equipment. If the leaching equipment is divided into series tanks or other compartments, the diluted acid mixture enters at multiple locations under independent pH control.

Carbon dioxide gas 5 is actively expelled and pumped out by exposing the slurry to a pressure less than atmospheric, either in the entire leaching equipment or in some part of it.

Leached slurry 7 passes from leaching equipment to neutralization equipment 8, which may consist of one or more series-connected stirred vessels or other conventional equipment for contacting liquids with particulate solids. Lime in solid, liquid or suspended form (i.e. milk of lime: calcium hydroxide) 9 is introduced to the neutralization equipment at a rate that is controlled for pH in the range from 6 to 9.5. Most of the phosphate dissolved in the leaching equipment returns to the purified phosphate mineral matter in the neutralization equipment.

Neutralized slurry 10 is withdrawn for separation by conventional means. In this example, the neutral slurry is allowed to settle by gravitational separation in a clarifier 11. Thickened slurry from the clarifier bottom 12 is dewatered with a belt filter press 14, or a drum or disk filter or similar equipment designed to minimize surface moisture retention. Cloudy particle-laden filtrate so removed is recycled 16 for treatment in the clarifier. The dewatered filter cake 15 consists of purified phosphate ore suitable for direct use in the wet phosphoric acid process.

Clarified leachate 13 is a solution containing principally magnesium nitrate. It is withdrawn to precipitation equipment 17 where a calcium-containing base 18 is mixed with the magnesium nitrate solution. The calcium-containing base may comprise dolime if a large yield of magnesium hydroxide is desired. The base may comprise oyster shell lime if premium quality magnesia is desired. The amount of calcium-containing base is sufficient that it provides approximately one calcium oxide molecule to replace each magnesium atom in solution 13. Thus, magnesium hydroxide solidifies and precipitates, while the principal solutes in circulating solution change from magnesium nitrate to calcium nitrate.

The precipitated mixture 19 is separated by conventional means such as filter 21. The solid product magnesium hydroxide 22 may be sold as a slurry in water for example, or may be calcined to make magnesium oxide for use in refractories or in production of magnesium metal.

Filtered calcium nitrate solution 20 is recirculated to the leaching equipment, where it is split into two streams. The major fraction is mixed with fresh phosphate mineral to make more slurry for leaching. The minor fraction is used to dilute the leaching acid mixture.

Nitric acid flow is controlled to avoid precipitating calcium sulfate in the magnesium hydroxide product. Flow is increased when dissolved calcium concentration measured in freshly withdrawn leached slurry 7 falls below roughly 0.02 moles/liter. Calcium concentration may be monitored continuously with a selective ion electrode.

EXAMPLE 1

A dolomitic phosphate ore from Florida was analyzed with the following results.

TABLE 1

Analysis of Dolomitic Phosphate Ore

| Species | Weight Percent |
|---|---|
| MgO | 3.8 |
| $P_2O_5$ | 26.1 |
| CaO | 37.7 |
| $Fe_2O_3$ | 1.54 |
| $Al_2O_3$ | 0.98 |

This ore was ball-milled so that 49% of it passed through a sieve with openings 0.045 mm square (325 Tyler mesh). 200 grams of this ore was then stirred vigorously in 910 ml of a water solution saturated in gypsum and containing 0.185 moles of calcium nitrate. Total slurry volume was 1000 ml.

The stirred slurry was boiled vigorously at atmospheric pressure. Water vapor produced by boiling was condensed and returned to the slurry. Concentrated sulfuric acid was added at the top of the condenser so that it mixed with at least 20 times its volume of condensed water returning to the slurry.

The pH of the slurry was continuously monitored and recorded by computer. At one-minute intervals the computer actuated a pump which delivered sulfuric acid to the condenser. The amount of sulfuric acid so dispensed was calculated to maintain slurry pH at 4.0.

Seventy percent of total acid consumed was introduced during the first 40 minutes. Later the rate of acid addition approached zero. The reaction was terminated at 206 minutes, at which time 17.8 ml of 17.9 molar acid had been consumed. Product analysis showed that 86.8% of original magnesium had dissolved from the ore, while 1.71% of the phosphate had dissolved.

The leached slurry was allowed to cool. When it had reached ambient temperature, calcium oxide (lime) was added gradually while monitoring pH of the stirred slurry. Lime addition was stopped when pH rose to 9. On standing the slurry pH declined to 8.0. Analysis of the liquid leachate showed that 0.02% of original ore phosphate remained in solution. Over 98% of the phosphate which had initially dissolved was returned to the solid phase by neutralization with lime.

Fresh leachate (not neutralized to pH 9 as above) was separated from leached residue and then basified to pH 12.5. Magnesium hydroxide so precipitated was washed and calcined to MgO and analyzed for iron, aluminum and fluoride. Iron could not be detected in the solid at a sensitivity level of 20 PPM. The fraction of ore iron leached was therefore less than 0.006%. Aluminum concentration in magnesium oxide was 400 PPM or 0.27% of total aluminum in the ore. Fluoride concentration was also 400 PPM. These impurities total less than 0.1% of byproduct MgO.

Leachate which was precipitated without intermediate neutralization contained 12% $P_2O_5$ in the product MgO after it was calcined. Leachate precipitated after intermediate neutralization to pH 9 contained 0.3% $P_2O_5$ in calcined MgO.

EXAMPLE 2

2000 metric tons per day of the dolomitic phosphorite described in example 1 is continuously mixed with a recirculated solution bearing calcium nitrate at a rate of 3000 cubic meters per day.

An additional 500 cubic meters per day of the recirculated solution is used to dilute sulfuric acid which leaches the dolomitic magnesium from the phosphate ore.

The slurry passes through four stirred tanks in series. pH is measured in each of these tanks, and the diluted sulfuric acid solution is automatically added to each tank in amount sufficient to maintain pH at 3.8. The sulfuric acid solution is introduced at the tips of shaft-driven impellers which stir the slurry and sustain particulate solids in suspension. Average retention time of solids in the four leaching tanks is 144 minutes. Approximately 75% of magnesium from the ore dissolves at a temperature of 75° C. (167° F.).

The slurry passes from the fourth and final leaching tank to a fifth tank. There the pH is controlled automatically at 8 to 9 by adding slaked oyster shell lime to the stirred slurry.

The neutralized slurry then passes to a clarifier, where leached solids sink to the bottom. Underflow from the clarifier is dewatered by suction with a rotating table filter, and the cloudy liquid so separated recirculates to the clarifier. Dewatered leached solid passes directly to a phosacid digester where it is used to produce phosphoric acid by the conventional wet phosphoric acid process.

Clear liquid leachate from the clarifier is then stirred with calcined dolomite (dolime) to precipitate its dissolved magnesium as is conventional in production of precipitated magnesium hydroxide. Magnesium oxide from the dolime adds to magnesium derived from leaching to increase the yield of magnesium hydroxide. Precipitated magnesium hydroxide is separated from the liquid conventionally, and the magnesium hydroxide is sold as a byproduct, either in slurry form or after calcination to MgO. Calcium nitrate solution is recirculated mostly to the first leaching tank and partly to dilute leaching acid as described above.

The dissolved calcium content of the product leachate is monitored continuously using a specific-ion electrode immersed in slurry entering the neutralization tank. Nitric acid flow is controlled in response to this signal to maintain calcium concentration of roughly 0.02 molar or greater. This concentration is sufficient to prevent calcium sulfate from precipitating as an impurity in product magnesium hydroxide.

Carbon dioxide is removed from the slurry in each of the four leaching tanks at reduced pressure. Part of the slurry is pumped up a tube into a chamber smaller than the leaching tank. Pressure in the chamber is less than ambient pressure by an amount equal to hydrostatic pressure in the tube. Dissolved gases boil out of solution at this reduced pressure, and are removed by pumping. The slurry stripped of dissolved gases then returns to the leaching tank by gravity flow down another tube. This arrangement is called a vacuum flash cooler when it is used conventionally in a phosphoric acid digester.

Carbon dioxide pumped out of the vacuum flash chamber is cooled to condense water vapor. It is piped directly to a nearby plant for use in making urea fertilizer.

In this example 2000 tons per day of phosphate ore are purified, consuming 207 TPD of sulfuric acid, 14 TPD of nitric acid, 2.7 TPD of oyster shell lime and 158 TPD of dolime. Production is 105 TPD of magnesium hydroxide and 93 TPD of carbon dioxide. Phosphate loss to the leachate is 0.1% of ore phosphate, and the $P_2O_5$ impurity in product magnesia is 0.23%. Magnesium oxide concentration in the purified ore is reduced from 2.5% to 0.6%.

What is claimed is:

1. A method for leaching magnesium from dolomitic phosphate minerals comprising:
   (a) forming a slurry by mixing particulate dolomitic phosphate minerals with a calcium-bearing solution;
   (b) maintaining said slurry by agitation so that substantially all of said particulate matter remains suspended in said solution;
   (c) mixing sulfuric acid into said slurry at such a rate and in such amount that slurry pH is maintained at a setting in the range from 3.3 to 4.5 controlled automatically by a pH sensing device connected to an electronic feedback loop equipped to control addition of said sulfuric acid to said slurry;
   (d) actively removing from said slurry dissolved carbon dioxide gas;
   (e) withdrawing said slurry;
   (f) separating said withdrawn slurry into a magnesium-bearing solution and a phosphate-bearing solid;
   (g) adding calcium-containing alkaline material to said magnesium-bearing solution in amount sufficient to replace magnesium with calcium in said solution to produce a calcium-bearing solution while converting essentially all dissolved magnesium into solid magnesium hydroxide;
   (h) separating solid magnesium hydroxide produced in step (g) from calcium-bearing solution produced in step (g);
   (i) mixing said calcium-bearing solution separated in step (h) with fresh particulate dolomitic phosphate minerals to form slurry according to step (a);
   (j) introducing a soluble compound into said slurry containing an anion, the calcium and magnesium salts of which are soluble in water, and maintaining a concentration of said soluble compound in said magnesium-bearing solution that is sufficient to prevent solidification of calcium to form calcium sulfate in mixture with said solid magnesium hydroxide produced in step (g).

2. Method of claim 1 wherein carbon dioxide gas is removed form said slurry at step (d) by reduction of pressure of gas in contact with said slurry.

3. Method of claim 1 wherein carbon dioxide gas is removed at step (d) by heating said slurry.

4. Method of claim 1 wherein carbon dioxide gas removed from said slurry is collected for use as a by-product.

5. Method of claim 1 wherein said slurry is heated to a temperature above ambient but not hotter than boiling.

6. Method of claim 1 wherein said phosphate-bearing mineral matter is pulverized to particle fineness such that at least 50 percent by mass passes through a sieve with mesh openings 0.075 mm square.

7. Method of claim 1 wherein said soluble compound introduced at step (j) is selected from the group consisting of nitric acid, acetic acid, formic acid, potassium nitrate, potassium acetate, potassium formate, and mixtures thereof.

8. Method of claim 1 wherein said slurry withdrawn at step (e) is treated prior to step (f) by mixing lime with said slurry in amount controlled for pH in the range from 6.0 through 9.5.

9. Method of claim 1 wherein a fraction of said calcium-bearing solution separated at step (h) is used to dilute said sulfuric acid prior to mixture with said slurry according to step (c).

10. Method of claim 9 wherein said soluble compound introduced at step (j) is mixed with said sulfuric acid prior to mixture of said sulfuric acid with said slurry in step (c).

* * * * *